(12) United States Patent
Buckley et al.

(10) Patent No.: US 11,330,558 B2
(45) Date of Patent: *May 10, 2022

(54) METHODS AND APPARATUS FOR PROVIDING NETWORK BROADCAST INFORMATION TO WLAN ENABLED WIRELESS COMMUNICATION DEVICES

(71) Applicant: BlackBerry Limited, Waterloo (CA)

(72) Inventors: Adrian Buckley, Tracy, CA (US); Vytautas Robertas Kezys, Ancaster (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,718

(22) Filed: Jul. 9, 2019

(65) Prior Publication Data

US 2019/0335422 A1 Oct. 31, 2019

Related U.S. Application Data

(63) Continuation of application No. 15/952,761, filed on Apr. 13, 2018, now Pat. No. 10,368,337, which is a (Continued)

(51) Int. Cl.
*H04W 72/00* (2009.01)
*H04W 4/06* (2009.01)
(Continued)

(52) U.S. Cl.
CPC ........... *H04W 72/005* (2013.01); *H04W 4/06* (2013.01); *H04W 48/10* (2013.01); *H04W 48/14* (2013.01);
(Continued)

(58) Field of Classification Search
CPC ...... H04W 4/06; H04W 48/10; H04W 72/005
See application file for complete search history.

(56) References Cited

U.S. PATENT DOCUMENTS 5,796,727 A 8/1998 Harrison et al.
6,081,826 A 6/2000 Masuoka et al.
(Continued)

FOREIGN PATENT DOCUMENTS

EP 1073296 1/2001
EP 1527644 5/2005
(Continued)

OTHER PUBLICATIONS

3rd Generation Partnership Project (3GPP), "3GPP TS 23.234—Technical Specification Group Services and Systems Aspects; 3GPP system to Wireless Local Area Network (WLAN) Interworking; System Description (Release 6)," V2.0.0, Sep. 2003, 68 pages.
(Continued)

*Primary Examiner* — Rhonda L Murphy
(74) *Attorney, Agent, or Firm* — Fish & Richardson P.C.

(57) ABSTRACT

One illustrative method of providing network broadcast information to a wireless device from a wireless local area network (WLAN) includes the steps of receiving, from one or more available cellular networks or a network database, cellular network broadcast information associated with the one or more available cellular networks; providing the cellular network broadcast information in a generic container message which varies in content and format according to one or more cellular standards associated with the one or more available cellular networks; and causing the generic container message to be regularly broadcasted for receipt and use by a wireless device. In an alternative approach, the steps include regularly broadcasting a network interworking indicator which is indicative of whether cellular network broadcast information is available for receipt from the WLAN; receiving a probe request from a wireless device; and causing the cellular network broadcast information to be sent to the wireless device in the generic container message
(Continued)

in response to the probe request from the wireless device. The generic container message may alternatively or additionally include wireless network broadcast information from different types of wireless networks (e.g. Wi-MAX) which are available to the WLAN.

18 Claims, 7 Drawing Sheets

Related U.S. Application Data continuation of application No. 14/941,388, filed on Nov. 13, 2015, now Pat. No. 9,967,859, which is a continuation of application No. 14/610,564, filed on Jan. 30, 2015, now Pat. No. 9,198,116, which is a continuation of application No. 10/993,278, filed on Nov. 19, 2004, now Pat. No. 8,964,707.

(60) Provisional application No. 60/523,515, filed on Nov. 19, 2003.

(51) Int. Cl.
| | | |
|---|---|---|
| *H04W 48/10* | (2009.01) | |
| *H04W 48/14* | (2009.01) | |
| *H04W 52/02* | (2009.01) | |
| *H04W 84/12* | (2009.01) | |

(52) U.S. Cl.
CPC ........ *H04W 52/0229* (2013.01); *H04W 84/12* (2013.01); *Y02D 30/70* (2020.08)

(56) References Cited

U.S. PATENT DOCUMENTS

| | | |
|---|---|---|
| 6,393,261 B1 | 5/2002 | Lewis |
| 6,950,419 B1 | 9/2005 | Park et al. |
| 7,146,130 B2 | 12/2006 | Hsu et al. |
| 7,251,488 B2 | 7/2007 | Chitrapu |
| 7,395,083 B2 | 7/2008 | Buckley |
| 7,441,043 B1 | 10/2008 | Henry et al. |
| 7,519,363 B2 | 4/2009 | Shin et al. |
| 7,778,641 B1 | 8/2010 | Willars et al. |
| 2002/0136226 A1 | 9/2002 | Christoffel et al. |
| 2002/0183060 A1 | 12/2002 | Ko et al. |
| 2002/0191575 A1 | 12/2002 | Kalavade et al. |
| 2003/0026223 A1 | 2/2003 | Eriksson et al. |
| 2003/0028763 A1 | 2/2003 | Malinen et al. |
| 2003/0031148 A1 | 2/2003 | Schmidt et al. |
| 2003/0119481 A1 | 6/2003 | Haverinen et al. |
| 2003/0133421 A1 | 7/2003 | Sundar et al. |
| 2003/0134650 A1 | 7/2003 | Sundar et al. |
| 2003/0214905 A1 | 11/2003 | Solomon |
| 2003/0228842 A1 | 12/2003 | Heinonen et al. |
| 2004/0008723 A1 | 1/2004 | Uchida et al. |
| 2004/0066756 A1* | 4/2004 | Ahmavaara ........... H04W 48/18 370/328 |
| 2004/0114601 A1 | 6/2004 | Watanabe et al. |
| 2004/0181692 A1 | 9/2004 | Wild et al. |
| 2004/0249983 A1 | 12/2004 | Bedner |
| 2005/0059397 A1 | 3/2005 | Zhao |
| 2005/0094593 A1 | 5/2005 | Buckley |
| 2005/0181776 A1 | 8/2005 | Verma et al. |
| 2005/0232209 A1 | 10/2005 | Buckley et al. |
| 2008/0095054 A1 | 4/2008 | Morford |
| 2008/0144589 A1 | 6/2008 | Buckley |
| 2013/0344867 A1* | 12/2013 | Rahman .................. H04W 8/22 455/435.1 |

FOREIGN PATENT DOCUMENTS

| | | |
|---|---|---|
| EP | 1528715 | 5/2005 |
| EP | 15287165 | 5/2005 |
| EP | 1096728 | 5/2010 |
| WO | 9939524 | 8/1999 |
| WO | 2004034714 | 4/2004 |

OTHER PUBLICATIONS

H. Haverinen & J. Salowey, "EAP SIM Authentication" Network Working group, Online! Oct. 27, 2003, pp. 1-72, HTTP://www.ietf.org/internet-drafts/drafts-haverinen-pppext-eap-sim-12.txt>.
WLAN Access Network Selection, 3GPP TSG-SA WG2 meeting #35, Bangkok, Thailand, Oct. 27-31, 2003, 3 pages.
Haverinen et al., "Cellular Access Control and Charging for Mobile Operator Wireless Local Area Networks", IEEE Wireless Communications, Dec. 2002, pp. 52-60, vol. 9 No. 6, IEEE Service Center, Piscataway NJ, USA.
Analysis of Network Selection Methods, 3GPP TSG-SA WG2 meeting #32, San Diego, California, USA, May 12-16, 2003, 2 pages.
ETSI; "Digital Enhanced Cordless Telecommunications (DECT); Common Interface (CI); Part 5: Network (NWK) Layer"; ETS 300 175-5; Dec. 1997; 271 pages; <http://www.etsi.org/deliver/etsi_i_ets/300100_300199/30017505/03_60/ets_30017505e03p.pdf>.
Australian Notice of Acceptance issued in Australian Application No. 2004310701, dated Feb. 17, 2009, 4 pages.
Australian Notice of Acceptance in Australian Application No. 2009202020, dated Aug. 17, 2011 3 pages.
Australian Notice of Allowance issued in Australian Application No. 2009202020, dated Sep. 15, 2011, 6 pages.
Australian Office Action in Australian Application No. 2004310701, dated Aug. 7, 2008, 2 pages.
Australian Office Action in Australian Application No. 2004310701, dated Jun. 19, 20074 pages.
Australian Office Action in Australian Application No. 2009202020, dated Jul. 28, 2010, 1 page.
Australian Office Action in Australian Application No. 2009202020, dated Nov. 16, 2010, 2 pages.
Australian Office Action in Australian Application No. 2011253780, dated Aug. 1, 2013, 3 pages.
Australian Office Action in Australian Application No. 2011253780, dated Jun. 7, 2012, 2 pages.
Australian Office Action in Australian Application No. 2014200834, dated Nov. 25, 2014, 2 pages.
Australian Patent Office, "Notice of Acceptance," issued in connection with Australian Application No. 2004224976, dated Aug. 30, 2007, 3 pages.
Canadian Intellectual Property Office, "Exam Report," issued in connection with Canadian Application No. 2,486,323, dated Jul. 16, 2007, 4 pages.
Canadian Intellectual Property Office, "Notice of Allowance," issued in connection with Canadian Application No. 2,486,323, dated Jul. 8, 2008, 1 page.
Canadian Notice of Allowance in Canadian Application No. 2,546,570, dated Apr. 8, 2010, 1 page.
Canadian Office Action Canadian Application No. 2,546,570, dated Jun. 11, 2009, in 3 pages.
Canadian Office Action in Canadian Application No. 2,546,570, dated Sep. 24, 2008, 3 pages.
Chinese Office Action in Chinese Application No. 200480040659.4, dated Apr. 26, 2012, 20 pages.
Chinese Office Action in Chinese Application No. 200480040659.4, dated Oct. 24, 2011, 10 pages.
Chinese Office Action, Chinese Application No. 200410089679.2, dated Jun. 6, 2008 6 pages.
Chinese Office Action, Chinese Application No. 2004100896792, dated Aug. 3, 2007 1 page.
State Intellectual Property Office of People's Republic of China, "First Office Action," issued in connection with Chinese Application No. 200410089679.2, dated Jul. 28, 2006, 16 pages.
Notification of Grant of Rights for Invention of Patent issued in connection with Chinese Application No. 200410089679.2 dated Feb. 6, 2009, 4 pages.

(56) References Cited

OTHER PUBLICATIONS

State Intellectual Property Office of People's Republic of China, "Second Office Action," issued in connection with Chinese Application No. 200410089679.2, dated Aug. 3, 2007, 1 page.
State Intellectual Property Office of People's Republic of China, "Third Office Action," issued in connection with Chinese Application No. 200410089679.2, dated Jun. 6, 2008, 6 pages.
Chinese Office Action, Chinese Application No. 2004100896792, dated Jul. 28, 2006 16 pages.
Chinese Reexamination Notification in Chinese Application No. 200480040659.4, dated Oct. 14, 2014 2 pages.
Chinese Rejection Decision in Chinese Application No. 200480040659.4, 1 dated Oct. 11, 2012, 5 pages.
English Translation of Chinese Office Action in Chinese Application No. 2004800406594, dated Apr. 29, 2010, 23 pages.
English Translation of Japanese Office Action in Japanese Application No. 2006-541570, dated Dec. 12, 2008.
Notice of Allowance issued in Chinese Application No. 200480040659.4 dated Aug. 6, 2015.
European Decision to Grant in European Application No. 04819552.3, 1 page.
European Decision to Grant in European Patent Application No. 10179 303.2, dated Sep. 27, 2011, 5 pages.
European Decision to Grant in European Patent Application No. 10179302.4, dated Oct. 6, 2011, 5 pages.
European Office Action in European Application No. 04819552.3, dated Feb. 16, 2009, 6 pages.
European Office Action in European Application No. 04819552.3, dated Jul. 10, 2008, 5 pages.
European Office Action in European Application No. 04819552.3, dated Nov. 8, 2007, 8 pages.
European Office Action in European Application No. 09162153.2, dated Apr. 30, 2010, 6 pages.
European Office Action in European Patent Application No. 03025014.6, dated Apr. 30, 2008 4 pages.
European Office Action in European Patent Application No. 04025655.4, dated Aug. 29, 2007 7 pages.
European Office Action in European Patent Application No. 04025655.4, dated May 30, 2008 4 pages.
Decision to Grant issued in European Application No. 03025014.6 dated Jun. 5, 2009, 2 pages.
Decision to Grant issued in European Application No. 04025655.4 dated Nov. 19, 2009, 2 pages.
Exam Report issued in European Application No. 03025014.6 dated Apr. 30, 2008, 4 pages.
Exam Report issued in European Application No. 03025014.6 dated Aug. 29, 2007, 6 pages.
Exam Report issued in European Application No. 04025655.4 dated Aug. 29, 2007, 7 pages.
Exam Report issued in European Application No. 04025655.4 dated May 30, 2008, 4 pages.
Intent to Grant issued in European Application No. 03025014.6 dated Jan. 12, 2009, 6 pages.
Intent to Grant issued in European Application No. 04025655.4 dated Jun. 15, 2009, 6 pages.
European Search Report issued in European Application No. 03025014.6 dated Apr. 20, 2004, 4 pages.
European Search Report issued in European Application No. 03025014.6 dated Mar. 29, 2004.
European Search Report issued in European Application No. 04025655.4 dated Dec. 9, 2004, 4 pages.
European Search Report issued in European Application No. 09162153.2 dated Sep. 1, 2009, 10 pages.
European Search Report issued in European Application No. 10179302.4 dated Oct. 26, 2010, 12 pages.
European Search Report issued in European Application No. 10179303.2 dated Oct. 26, 2010, 12 pages.
European Supplementary Search Report issued in European Application No. 04819552.3 dated Jul. 17, 2007, 5 pages.
International Search Report and Written Opinion in International Application No. PCT/US2004/039025, dated Jul. 6, 2006, 10 pages.
International Preliminary Report on Patentability in International Application No. PCT/US2004/039025, dated Aug. 7, 2006, 6 pages.
Japanese Notice of Allowance issued in Japanese Application No. 2006-541570, dated Nov. 18, 2009, 3 pages.
Japanese Notice of Reasons for Rejection, in Japanese Application No. 2006-541570, dated Jun. 30, 2008, 10 pages.
Japanese Office Action in Japanese Application No. 2004318623, dated May 23, 2008 5 pages.
Japanese Office Action in Japanese Application No. 2004318623, dated Sep. 28, 2009 2 pages.
Japanese Office Action in Japanese Application No. 2008306868, dated Feb. 8, 2011 2 pages.
Japanese Patent Office, "Notice of Allowance," issued in connection with Japanese Application No. 2004-318623, dated Apr. 14, 2010, 3 pages.
Japanese Patent Office, "Notice of Reasons for Rejection," issued in connection with Japanese Application No. 2004-318623, dated May 29, 2008, 5 pages.
Japanese Patent Office, "Office Action," issued in connection with Japanese Application No. 2004-318623, dated Sep. 28, 2009, 3 pages.
Japanese Patent Office, "Office Action," issued in connection with Japanese Application No. 2008-306868, dated Feb. 10, 2011, 2 pages.
Korean Notice of Allowance in Korean Application No. 10-2006-7011981, dated Dec. 1, 2007.
Korean Office Action in Korean Application No. 10-2006-7011981, dated May 2, 2007, 6 pages.
Korean Patent Office, "Notice of Decision for Patent," issued in connection with Korean Application No. 10-2004-0087349, dated Apr. 18, 2007, 3 pages.
Mexican Institute of Industrial Property, "Office Action," issued in connection with Mexican Application No. PA/ a/2004/010707, dated Feb. 8, 2008, 2 pages.
Mexican Institute of Industrial Property, "Office Action," issued in connection with Mexican Application No. PA/a/2004/010707, dated Apr. 24, 2008, 4 pages.
Mexican Office Action in Mexican Application No. PA/a/2004/010707, dated Apr. 24, 2008 3 page.
Mexican Office Action in Mexican Application No. PA/a/2004/010707, dated Feb. 21, 2007 1 page.
Mexican Office Action in Mexican Application No. PA/a/2004/010707, dated Feb. 8, 2008 3 page.
Mexican Office Action in Mexican Application No. PA/a/2006/005656, dated Jul. 21, 2009, 5 pages.
Mexican Office Action in Mexican Application No. PA/a/2006/005656, dated Mar. 25, 2009, 5 pages.
Mexican Office Action in Mexican Application No. PA/a/2006/005656, dated Oct. 30, 2008, 6 pages.
Notice of Allowance issued in Mexican Application No. PA/a/2006/005656, dated Oct. 23, 2009, 1 page.
Office Action issued in U.S. Appl. No. 11/959,081 dated Aug. 11, 2017.
Office Action issued in U.S. Appl. No. 15/952,761 dated Nov. 30, 2018, 10 pages.
Notice of Allowance issued in U.S. Appl. No. 15/952,761 dated Mar. 15, 2019, 8 pages.

* cited by examiner

METHODS AND APPARATUS FOR PROVIDING NETWORK BROADCAST INFORMATION TO WLAN ENABLED WIRELESS COMMUNICATION DEVICES

RELATED APPLICATIONS

This patent arises from a continuation of U.S. patent application Ser. No. 15/952,761, filed on Apr. 13, 2018, which is continuation of U.S. patent application Ser. No. 14/941,388, filed on Nov. 13, 2015, which is continuation of U.S. patent application Ser. No. 14/610,564, filed on Jan. 30, 2015, which is a continuation of U.S. patent application Ser. No. 10/993,278, filed on Nov. 19, 2004, now U.S. Pat. No. 8,964,707, which claims priority to U.S. Provisional Patent Application No. 60/523,515, filed on Nov. 19, 2003, all of which are hereby incorporated herein by reference in their entireties.

BACKGROUND

Field of the Technology

The present application relates generally to wireless communication devices which communicate with both wireless local area networks (WLANs) and cellular networks, and more particularly to the communication of cellular network information for one or more cellular networks to a mobile station through a WLAN.

Description of the Related Art

In the field of wireless local area networks (WLANs), there is an existing method of broadcasting information specific to a WLAN using binary and textual information. There is also an initiative to enable a WLAN to communicate with one or more 3$^{rd}$ Generation Partnership Project (3GPP) cellular networks in order to provide cellular users access to a higher bandwidth via the WLAN while still being able to access their cellular service.

WLANs were originally designed for wireless LAN connectivity; no provisions were made for cellular network communication. Traditionally, no suitable way has been provided to advertise whether "interworking" between a WLAN and cellular networks exists. Further, no suitable techniques have been established to identify which cellular networks a given WLAN may interwork with or any other information for allowing a mobile station to select cellular networks for communication.

Currently, a WLAN may broadcast a textual string, referred to as a Service Set ID (SSID), to identify itself. WLAN operators often establish their own broadcast information (i.e. an SSID) specific to their needs, including such data as branding information and/or a name for use by a smart client application. WLAN operators are reluctant to change their broadcast SSIDs to make them compatible with cellular network identifiers.

Interconnection amongst multiple networks requires that a Subscriber Identity Module (SIM) or Universal Subscriber Identity Module (U-SIM) be used to identify the subscriber. The U-SIM also contains information that identifies preferred and forbidden networks that the subscriber is allowed to use. This information is stored as a Mobile Country Code (MCC) and a Mobile Network Code (MNC) pair in the SIM or U-SIM. If a broadcast SSID has been assigned to a WLAN and the WLAN operator does not wish to change it, there is no established way that the MCC and MNC pair can be broadcasted from the WLAN to the mobile station.

There is a mechanism that allows the mobile station to probe the WLAN for other supported SSIDs. The WLAN will only respond to a probe request, however, if the WLAN supports the SSID. Therefore, a mobile station would need to probe for every known network to determine whether the WLAN supports cellular network interworking. Such a method is time-consuming, inefficient, and reduces the battery life of the mobile station. There is a resulting need for a more efficient method to provide cellular network information to a WLAN enabled mobile station.

SUMMARY

Methods and apparatus for providing network broadcast information from a wireless local area network (WLAN) to WLAN-enabled wireless communication devices are described herein.

One illustrative method includes the steps of receiving, from one or more available wireless networks or a network database, wireless network broadcast information associated with the one or more available wireless networks; providing the wireless network broadcast information in a generic container message which varies in content and format according to one or more wireless standards associated with the one or more available wireless networks; and causing the generic container message to be regularly broadcasted for receipt and use by the wireless device.

In an alternative approach, the steps include regularly broadcasting a network interworking indicator which is indicative of whether the wireless network broadcast information is available for receipt from the WLAN; receiving a probe request from a wireless device; and causing the wireless network broadcast information to be sent to the wireless device in a generic container message in response to the probe request from the wireless device.

Preferably, the wireless network broadcast information in the generic container message includes cellular network broadcast information associated with different types of cellular networks. The generic container message may alternatively or additionally include wireless broadcast information from different types of wireless networks (e.g. Wi-MAX) which are available to the WLAN. Other aspects and features of the present application will become apparent to those ordinarily skilled in the art upon review of the following description of specific embodiments of the present invention in conjunction with the accompanying figures.

BRIEF DESCRIPTION OF THE DRAWINGS

Embodiments of the present application will now be described, by way of example only, with reference to the attached figures. Same reference numerals are used in different figures to denote similar elements.

DETAILED DESCRIPTION OF THE PREFERRED EMBODIMENTS

Methods and apparatus for providing network information from a wireless local area network (WLAN) to WLAN-enabled wireless communication devices are described herein. One illustrative method includes the steps of receiving, from one or more available cellular networks or a network database, cellular network broadcast information associated with the one or more available cellular networks; providing the cellular network broadcast information in a generic container message which varies in content and format according to one or more cellular standards associated with the one or more available cellular networks; and causing the generic container message to be regularly broadcasted for receipt and use by the wireless device. In an alternative approach, the steps include regularly broadcasting a network interworking indicator which is indicative of whether the cellular network broadcast information is available for receipt from the WLAN; receiving a probe request from a wireless device; and causing the cellular network broadcast information to be sent to the wireless device in a generic container message in response to the probe request from the wireless device. Note that the generic container message may alternatively or additionally include wireless network broadcast information from different types of wireless networks (e.g. Wi-MAX) which are available to the WLAN.

Thus, the techniques provide network broadcast information to WLAN-enabled wireless devices which may utilize this information for network selection purposes. The network broadcast information may be broadcasted by the WLAN at regular intervals, or be solicited from the WLAN by a wireless device. Preferably, the cellular network information is included in a generic container message which varies in content and format according to one or more cellular standards associated with one or more networks available to the WLAN. If the solicited approach is utilized, the wireless device requests the network broadcast information by sending a probe request for the known Service Set Identifier (SSID) associated with the WLAN. Upon receipt of the probe request, the WLAN sends the generic container message to the wireless device in a probe response. In this solicited approach, the broadcast information from the WLAN includes an indicator (e.g. a flag) which indicates that network interworking is available. The wireless device, upon detection of this indicator, performs the probe request to obtain the network broadcast information.

Figure 1:
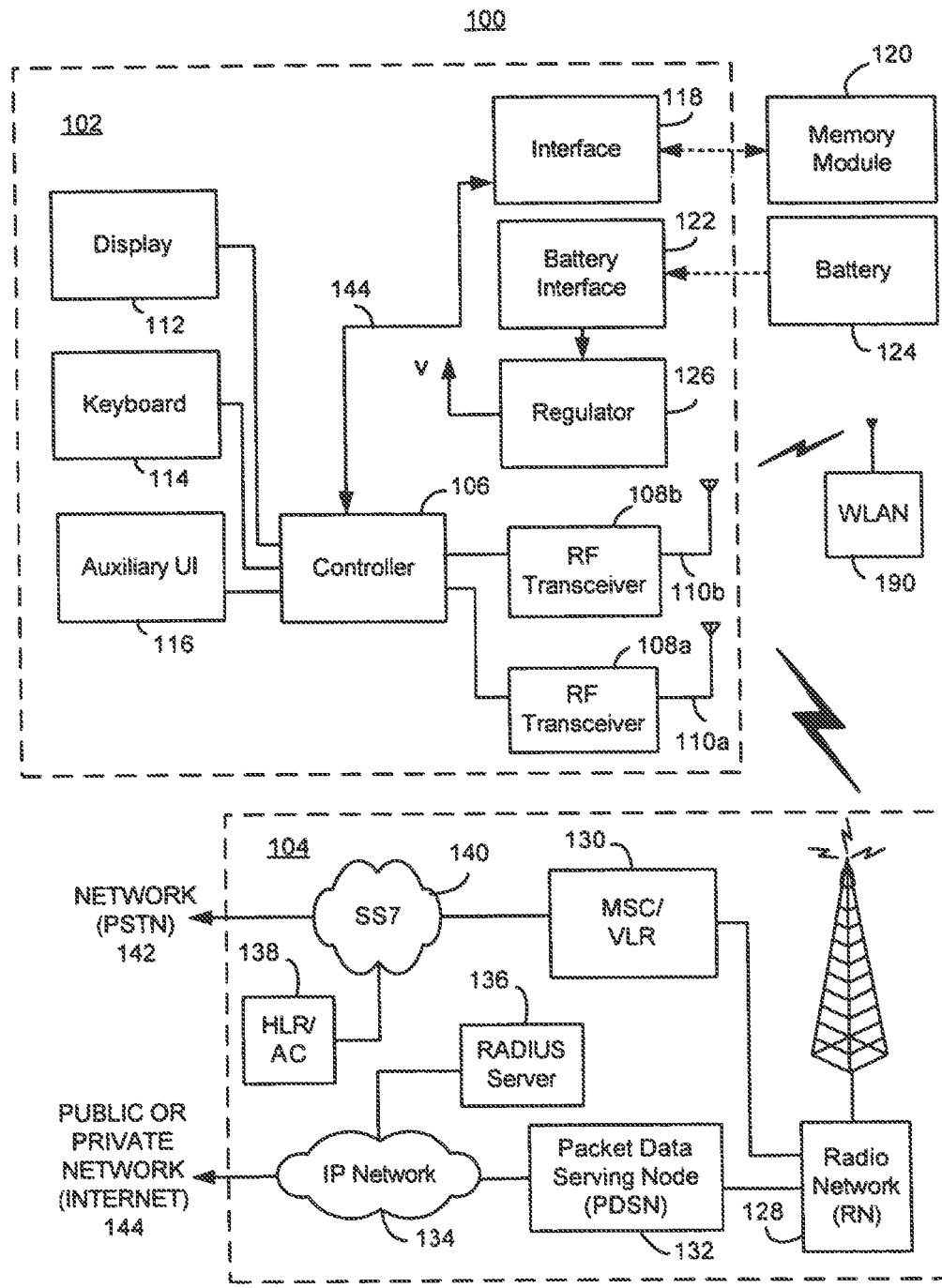
FIG. 1 is a block diagram illustrating the pertinent components of a wireless communication device which operates in a wireless communication system.

Referring now to the drawings, FIG. 1 is a schematic block diagram illustrating the basic components of a wireless communication device 102 which operates in a wireless communication system 100. As shown in FIG. 1, wireless device 102 is adapted to communicate with a wireless local area network (WLAN) 190. Also as shown, wireless device 102 may be adapted to communicate with a wireless communication network 104 which is a cellular telecommunications network. For wireless communication with wireless network 104, wireless device 102 utilizes radio frequency (RF) transceiver circuitry 108a and an antenna 110a. For wireless communication with WLAN 190, wireless device 102 utilizes RF transceiver circuitry 108b and an antenna 110b. With such configuration, wireless device 102 may be referred to as a "dual mode" communication device. Although shown in FIG. 1 as having separate and independent transceiver components, at least some portions or components of these otherwise different transceivers may be shared where possible. Note that wireless device 102 may alternatively be a "single mode" device which does not have RF transceiver 108a and antenna 110a but rather communicates only with WLAN 190.

Wireless device 102 preferably includes a visual display 112, a keyboard 114, and perhaps one or more auxiliary user interfaces (UI) 116, each of which is coupled to a controller 106. Controller 106 is also coupled to RF transceiver circuitry 108a and antenna 110a as well as RF transceiver circuitry 108b and antenna 110b. Typically, controller 106 is embodied as a central processing unit (CPU) which runs operating system software in a memory component (not shown). Controller 106 will normally control overall operation of wireless device 102, whereas signal-processing operations associated with communication functions are typically performed in the RF transceiver circuitry. Controller 106 interfaces with device display 112 to display received information, stored information, user inputs, and the like. Keyboard 114, which may be a telephone type keypad or full alphanumeric keyboard, is normally provided for entering data for storage in wireless device 102, information for transmission to network 104, a telephone number to place a telephone call, commands to be executed on wireless device 102, and possibly other or different user inputs.

Wireless device 102 sends communication signals to and receives communication signals over wireless communication links. For example, wireless device 102 may communicate with wireless network 104 via antenna 110a. RF transceiver circuitry 108a performs functions similar to those of a radio network (RN) 128, including for example modulation/demodulation and possibly encoding/decoding and encryption/decryption. It is also contemplated that RF transceiver circuitry 108a may perform certain functions in addition to those performed by RN 128. It will be apparent to those skilled in art that RF transceiver circuitry 108a will be adapted to particular wireless network or networks in which wireless device 102 is intended to operate.

Wireless device 102 includes a battery interface 122 for receiving one or more rechargeable batteries 124. Battery 124 provides electrical power to electrical circuitry in wireless device 102, and battery interface 122 provides for a mechanical and electrical connection for battery 124. Battery interface 122 is coupled to a regulator 126 which regulates power to the device. Wireless device 102 also operates using a memory module 120, such as a Subscriber Identity Module (SIM), a Universal SIM (U-SIM), or a Removable User Identity Module (R-UIM), which is connected to or inserted in wireless device 102 at an interface 118.

Wireless device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, wireless device 102 may be a multiple-module unit comprising a plurality of separate components, including but in no way limited to a computer or other device connected to a wireless modem. In particular, for example, in the wireless device block diagram of FIG. 1, RF transceiver circuitry 108a and antenna 110a may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108a and antenna 110a of a single-unit device such as one of those described above. Such a wireless device 102 may have a more particular implementation as described later in relation to mobile station 202 of FIG. 2.

Although described herein as utilizing a specific communication technology, wireless network 104 may operate in accordance with any suitable communication protocol, especially Wideband Code Division Multiple Access (W-CDMA) and Enhanced Data rates for Global Evolution (EDGE) technologies. In the embodiment of FIG. 1, wireless network 104 is a Third Generation (3G) supported network based on CDMA technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, wireless device 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from wireless devices within its cell. The base station transceiver system normally performs such functions as modulation and possibly encoding and/or encryption of signals to be transmitted to the wireless device in accordance with particular, usually predetermined, communication protocols and parameters, under control of its controller. The base station transceiver system similarly demodulates and possibly decodes and decrypts, if necessary, any communication signals received from wireless device 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and wireless device 102. An RF channel is a limited resource that must be conserved, typically due to limits in overall bandwidth and a limited battery power of wireless device 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all wireless device's 102 registered with a network operator, permanent data (such as wireless device 102 user's profile) as well as temporary data (such as wireless device's 102 current location) are stored in a HLR/AC 138. In case of a voice call to wireless device 102, HLR/AC 138 is queried to determine the current location of wireless device 102. A Visitor Location Register (VLR) of MSC 130 is responsible for a group of location areas and stores the data of those wireless devices that are currently in its area of responsibility. This includes parts of the permanent wireless device data that have been transmitted from HLR/AC 138 to the VLR for faster access. However, the VLR of MSC 130 may also assign and store local data, such as temporary identifications. Wireless device 102 is also authenticated on system access by HLR/AC 138. In order to provide packet data services to wireless device 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
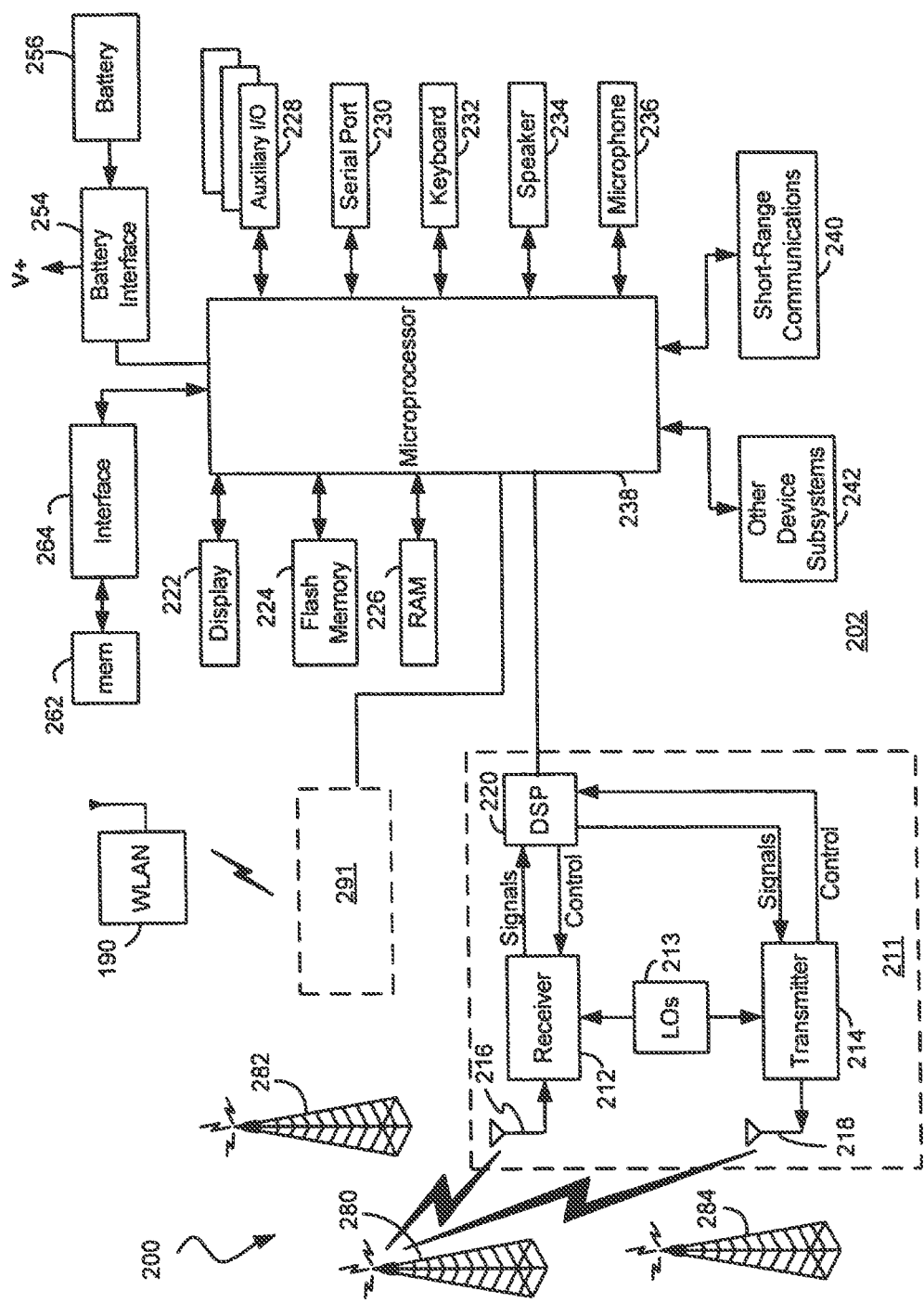
FIG. 2 is a more detailed block diagram of a preferred wireless device of FIG. 1, namely, a mobile station.

FIG. 2 is a more detailed diagram of a preferred wireless device of FIG. 1, namely a mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities).

As shown in FIG. 2, mobile station 202 is adapted to wirelessly communicate with WLAN 190. Also as shown, mobile station 202 may be adapted to wirelessly communicate with cellular base station transceiver systems 200. For communication with cellular networks, mobile station 202 utilizes communication subsystem 211. For communication with WLANs, mobile station 202 utilizes an additional communication subsystem 291 which has the same structural components as communication subsystem 211. With such configuration, mobile station 202 may be referred to as a "dual mode" mobile station. Although shown in FIG. 2 as having separate and independent subsystems, at least some portions or components of these otherwise different subsystems may be shared where possible. Note that mobile station 202 may alternatively be a "single mode" mobile station which does not have communication subsystem 211 but rather communicates only with WLAN 190 through communication subsystem 291.

Communication subsystem 211 includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108a and antenna 110a shown in FIG. 1. As will be apparent to those skilled in field of communications, particular design of communication subsystem 211 depends on the communication network in which mobile station 202 is intended to operate.

Mobile station 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card, a Universal SIM (U-SIM), or a Removable User Identity Module (R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) that provides power V+ to all of the circuitry.

Mobile station 202 includes a microprocessor 238 (which is one implementation of controller 106 of FIG. 1) that controls overall operation of mobile station 202. This control includes the wireless broadcast information processing techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications that control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile station 202 with respect to such items. This is especially advantageous where the host computer system is the wireless device user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component that provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 3:
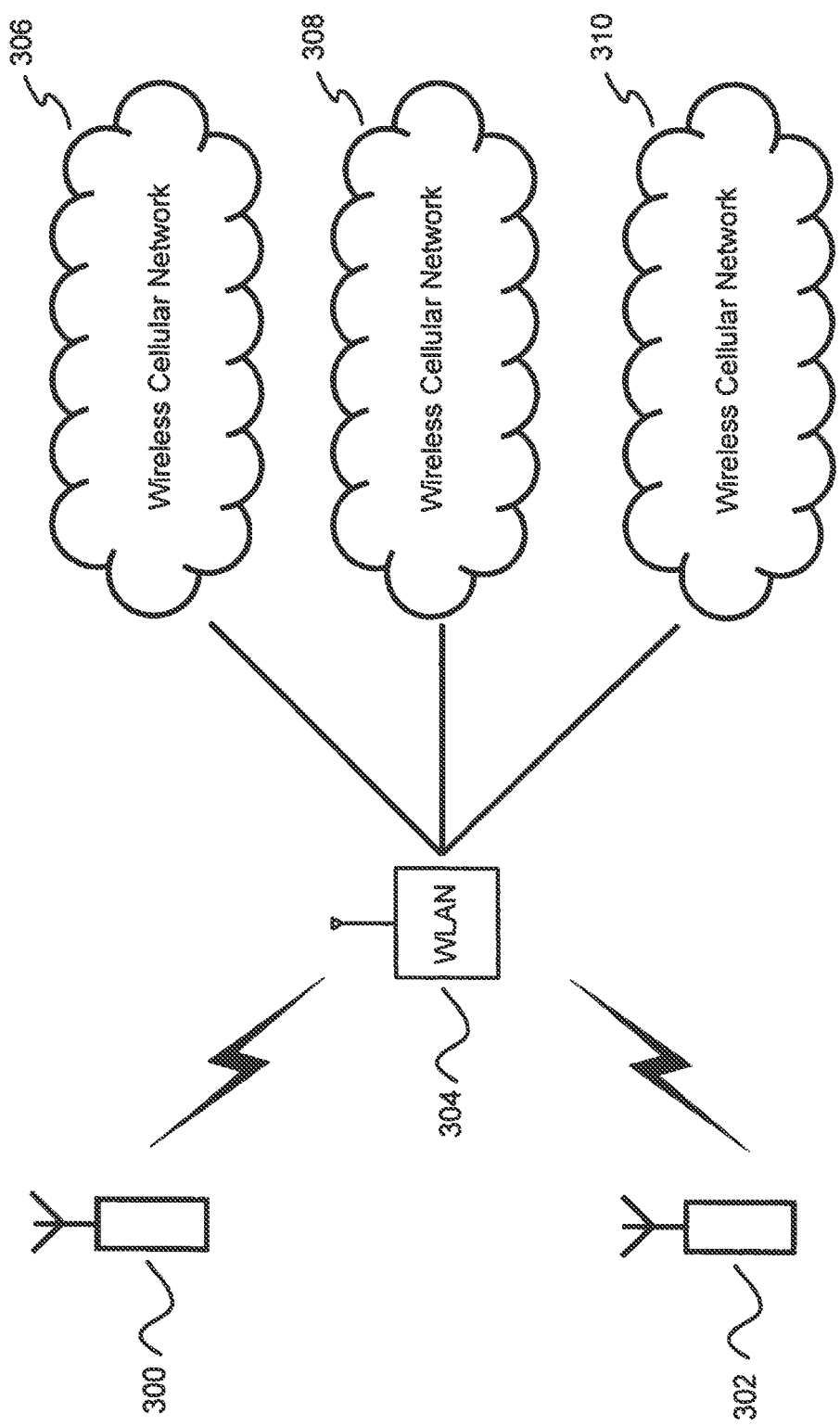
FIG. 3 is a block diagram of a communication system which includes a wireless local area network (WLAN), cellular telecommunication networks, and WLAN-enabled wireless devices.

FIG. 3 is a block diagram illustrating a communication system which includes a wireless local area network (WLAN) 304, cellular telecommunication networks 306, 308, and 310, and WLAN-enabled wireless devices 300 and 302. WLAN-enabled wireless devices 300 and 302 may have the structure and operation as described in relation to FIGS. 1 and 2. Note that there may be many more wireless devices, WLANs, and cellular networks provided in the communication system in addition to those shown. As shown, WLAN 304 is connected to one or more cellular networks 306, 308, and 310. WLAN 304 receives information from cellular networks 306, 308, and 310 through wired connections or other suitable means (e.g. via a T1/E1 connection or a point-to-point radio link). WLANs may be positioned in any suitable area or environment, and are typically found in coffee shops, restaurants, hotels, airports, and company offices. Areas within which WLANs provide coverage may be referred to as "hot spots". Wireless devices 300 and 302 communicate wirelessly within and through WLAN 304 over radio frequency (RF) communication links. WLANs are typically wire-connected to the Internet using traditional Telco connections to provide higher bandwidth data communications for wireless devices 300 and 302. WLAN 304 operates in accordance with IEEE or ETSI standards, for example, although any suitable communication technologies may be utilized.

Figure 4:
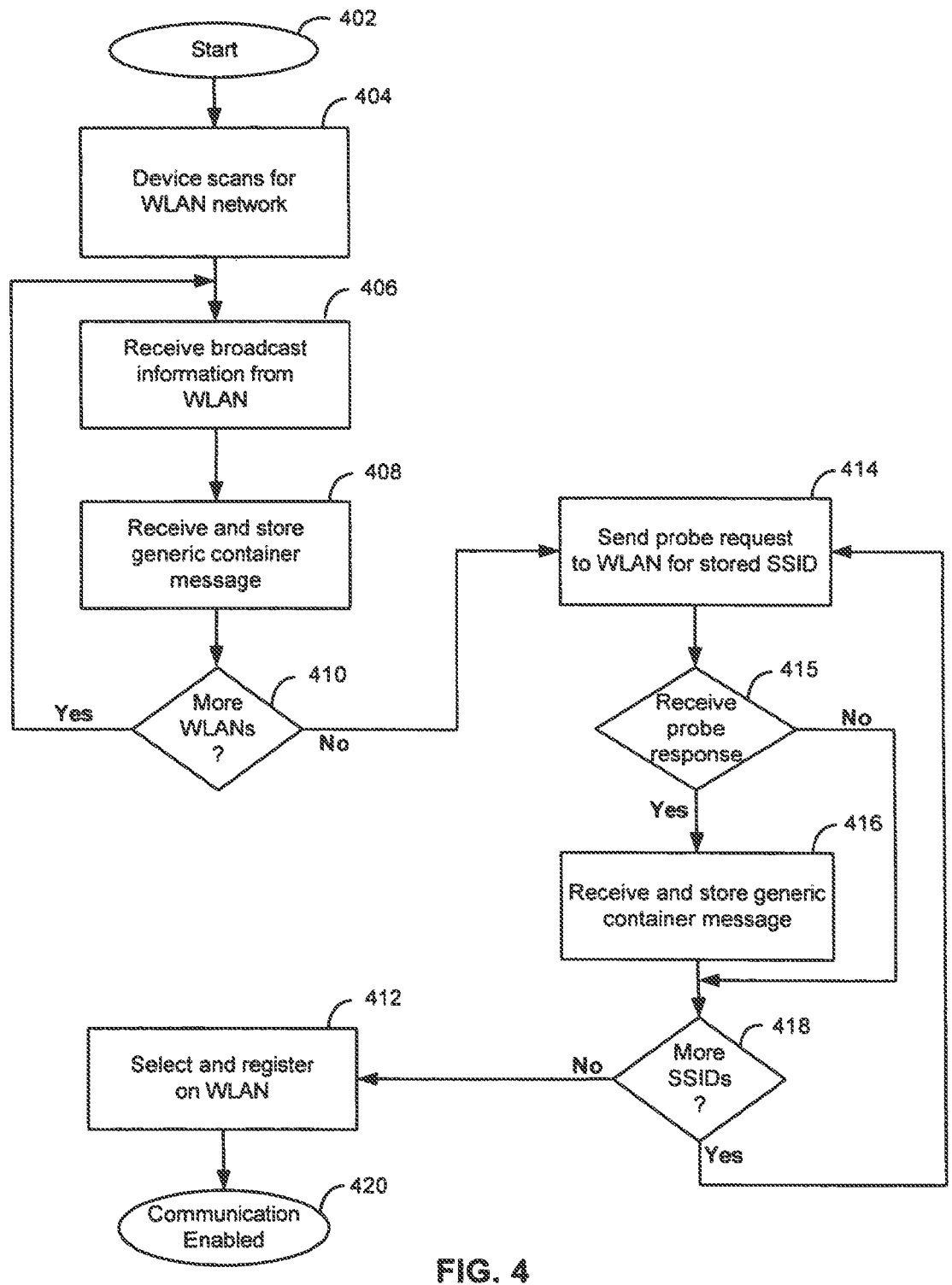
FIG. 4 is a flowchart illustrating a method of providing for the communication of network broadcast information between a WLAN and a wireless device.

FIG. 4 is a flowchart illustrating a general method of providing for the communication of cellular network information between a WLAN and a wireless device. This method may be performed in the environment described in relation to FIG. 3, with the wireless device shown and described in relation to FIGS. 1-2. The steps are performed by one or more controllers or processors (e.g. microprocessor 238 of FIG. 2) of the wireless device, in connection with any other necessary device components (e.g. its RF transceivers). As apparent from this description, the WLAN performs a complimentary method associated with the wireless device method. A computer program product of the present application may include a storage medium (e.g. FLASH memory 224 of FIG. 2) and computer instructions stored in the storage medium which are executed by the one or more processors for performing the method.

Beginning at a start block 402 of FIG. 4, the wireless device performs a scanning operation using its RF transceiver to identify any available WLANs within coverage (step 404 of FIG. 4). In this step, the wireless device scans all available bands (e.g. 2.4 Gigahertz, 5 Gigahertz, or both) to identify all possible WLANs available at its current location. Assuming at least one WLAN is identified, the wireless device selects one of the WLANs and uses its RF transceiver to monitor broadcast information from the selected WLAN. Upon monitoring, the wireless device receives broadcast information from the WLAN (step 406 of FIG. 4). The broadcast information is regularly or periodically broadcasted by the WLAN to all compatible wireless devices, preferably at a predetermined repetition rate. Specifically, the broadcast information may be sent within a regularly-broadcasted frame known as a "beacon frame." These frames include header information which indicate whether or not they are broadcast frames.

The broadcast information may include what is referred to as a "generic container message". A generic container message includes cellular network broadcast information associated with all cellular networks available to the WLAN (e.g. cellular networks 306, 308, and 310 available to WLAN 304 of FIG. 3). As apparent by its name, the generic container message is not technology or standard-specific and may contain network broadcast information from any one or more of a variety of different cellular networks (e.g. 3GPP, 3GPP2, or other suitable standard). As the information may be received from networks associated with different cellular technologies and/or standards, the information in the generic container message may vary in content and format in accordance with the one or more cellular standards associated with the networks. For example, the cellular format may be based on $3^{rd}$ Generation Partnership Project (3GPP), and/or $3^{rd}$ Generation Partnership Project 2 (3GPP2), and/or any other cellular or wireless network standards. Technology-specific information in the generic container message is identified by an appropriate identification, such as a technology or organization identification.

Thus, the WLAN may receive network broadcast information having a content and format defined by two or more different cellular standards and/or communication protocols. The cellular network broadcast information may include all of the information ordinarily broadcasted by the associated cellular network or, alternatively, a subset thereof. Preferably, the cellular network information includes, amongst other information, broadcast information having information that uniquely identifies a cellular network. For example, the information that uniquely identifies a cellular network may include a system identification (SID) and/or a mobile country code (MCC) and mobile network code (MNC) pair.

The WLAN initially receives this information from the available cellular networks or one or more network databases, and provides or formats the information into the generic container message. Preferably, the cellular network information is stored in an organized manner according to technology, networks, and content (see e.g. Table 1 below).

TABLE 1

An example of the organized storage of network broadcast information in the WLAN; also an example of the order in which the cellular network information is generally transmitted in the generic container message by the WLAN; and also an example of the organized storage of cellular network information in the wireless device.

| Technology/ Standard | Network Identification (e.g. MNC/MCC or SID) | Network Broadcast Information | Broadcast Interval |
|---|---|---|---|
| 3GPP | Network 1 | Broadcast Information 1 | Interval 1 |
|  |  | Broadcast Information 2 | Interval 2 |
|  |  | ... | ... |
|  |  | Broadcast Information N | Interval N |
|  | Network 2 | Broadcast Information 1 | Interval 1 |
|  |  | Broadcast Information 2 | Interval 2 |
|  |  | ... | ... |
|  |  | Broadcast Information N | Interval N |
|  | ... | ... | ... |
|  | Network M | Broadcast Information 1 | Interval 1 |
|  |  | Broadcast Information 2 | Interval 2 |
|  |  | ... | ... |
|  |  | Broadcast Information N | Interval N |
| 3GPP2 | Network 3 | Broadcast Information 1 | Interval 1 |
|  |  | Broadcast Information 2 | Interval 2 |
|  |  | ... | ... |
|  |  | Broadcast Information N | Interval N |
|  | Network 4 | Broadcast Information 1 | Interval 1 |
|  |  | Broadcast Information 2 | Interval 2 |
|  |  | ... | ... |
|  |  | Broadcast Information N | Interval N |
|  | ... | ... | ... |
|  | Network P | Broadcast Information 1 | Interval 1 |
|  |  | Broadcast Information 2 | Interval 2 |
|  |  | ... | ... |
|  |  | Broadcast Information N | Interval N |
| Other | Network 5 | Broadcast Information 1 | Interval 1 |
|  |  | Broadcast Information 2 | Interval 2 |
|  |  | ... | ... |
|  |  | Broadcast Information N | Interval N |
|  | Network 6 | Broadcast Information 1 | Interval 1 |
|  |  | Broadcast Information 2 | Interval 2 |
|  |  | ... | ... |
|  |  | Broadcast Information N | Interval N |
|  | ... | ... | ... |
|  | Network Q | Broadcast Information 1 | Interval 1 |
|  |  | Broadcast Information 2 | Interval 2 |
|  |  | ... | ... |
|  |  | Broadcast Information N | Interval N |

Note that the generic container message may alternatively or additionally include wireless network broadcast information (in contrast to cellular network broadcast information) from any wireless networks available to the WLAN. For example, the generic container message may include wireless network broadcast information associated with one or more available wireless networks operating in accordance with Wi-MAX technology. Wi-MAX is technology based on the IEEE 802.16 Air Interface Standard for fixed wireless broadband access systems employing a point-to-multipoint (PMP) architecture.

If the broadcast information from the WLAN includes a generic container message, the wireless device receives and decodes the generic container message to thereby reveal the network broadcast information contained within it (step 408 of FIG. 4). The wireless device then stores this information in its memory, preferably in the organized fashion shown and described in relation to Table 1 above. Thus, the wireless device stores available network broadcast information for multiple different types of networks to which the wireless device may interconnect. Preferably, the wireless device retains this information in a non-volatile memory so that the information is retained if the wireless device is powered off.

Note that such information is stored for each WLAN encountered by the wireless device. In the wireless device memory, an association is made between each WLAN that the wireless device encounters (e.g. preferably based on the SSID) and the available cellular network information received from the WLAN. Note also that the broadcast information may also include broadcast interval data associated with each network. The interval data is indicative of the interval at which the information is broadcasted; interval data is used to calculate the repetition rate of the broadcast. Referring to Table 1 above, the 3GPP Information has broadcast information from 1 to n and associated interval data from 1 to n. Also, a separate container stores 3GPP2 Information having broadcast information 1 to n and associated interval data from 1 to n.

If there are more WLANs which were identified from the previous scanning operation (step 410 of FIG. 4), then the wireless device repeats the steps for each such WLAN. If not, the wireless device solicits known WLANs which may be operating in a "stealth mode". While operating in a stealth mode, a WLAN refrains from broadcasting its SSID to wireless devices. Wireless devices may solicit such WLANs with "probe requests" using a Service Set Identifier (SSID) of the WLAN. Thus, the wireless device may send a probe request to the WLAN for a known stored SSID of the WLAN (step 414 of FIG. 4). The WLAN should normally respond to the wireless device with a probe response which is received by the wireless device (step 415 of FIG. 4). If network interworking is supported by the WLAN, the WLAN returns a generic container message (as described above) in its probe response to the wireless device (step 416 of FIG. 4). This generic container message is received, decoded, and stored by the wireless device as described earlier above. If network interworking is not supported by the WLAN, then step 416 is not performed. Next, if there are additional stored SSIDs to consider for probe requests (step 418 of FIG. 4), then the wireless device repeats steps 414, 415, and 416 for the probing additional WLANs.

Thereafter, the wireless device selects and registers onto a selected WLAN (step 412 of FIG. 4). This will enable the wireless device and the WLAN to communicate (step 420 of FIG. 4). The wireless device may then perform network selection after receiving the network broadcast information, to communicate with one of the networks identified from the generic container message. In particular, the wireless device may utilize the MCC/MNC pairs (or the SID) within the cellular network information to perform network selection. The wireless device may select one of these networks (e.g. its "home" or other network in accordance with a preferred network list or through manual selection via a user interface) through the WLAN. In particular, the wireless device signals the WLAN with the selected network using a Network Access Identifier (NAI). This takes place of a conventional scanning operation of the wireless device for cellular network selection.

Note that, in step 408 of FIG. 4, the wireless device may not receive any generic container message in the broadcast information from the WLAN. Rather, the wireless device may receive a network interworking indicator (e.g. a bit flag) which is indicative of whether the network broadcasting information is available from the WLAN. The wireless device makes a decision to perform a probe request to the WLAN based on this indicator. Specifically, if the indicator indicates that the network broadcast information is available from the WLAN (e.g. bit flag='1'), then the wireless device performs a probe request to the WLAN using its SSID; if the indicator indicates that the network broadcast information is unavailable from the WLAN (e.g. bit flag='0'), then the wireless device refrains from performing a probe request to the WLAN.

Thus, a WLAN of the present application is adapted to receive, from one or more available cellular networks or a network database, cellular network broadcast information associated with one or more available cellular networks; provide the cellular network broadcast information in a generic container message which varies in content and format according to one or more cellular standards associated with the one or more available cellular networks; and cause the generic container message to be regularly broadcasted for receipt and use by a wireless device. On the other hand, the wireless device of the present application includes one or more processors; memory coupled to the one or more processors; a radio frequency (RF) transceiver coupled to the one or more processors; and an antenna coupled to the RF transceiver. The one or more processors of the wireless device are operative to monitor broadcast information from a wireless local area network with use of the RF transceiver; receive a generic container message which is regularly broadcasted by the wireless local area network, the generic container message including cellular network broadcast information associated with one or more available cellular networks which varies in content and format in accordance with one or more cellular standards associated with the one or more available cellular networks; decode the generic container message to identify the cellular network broadcast information associated with the one or more available cellular networks; and store the cellular network broadcast information in the memory.

Alternatively, the WLAN of the present application is adapted to receive, from one or more available cellular networks or a network database, cellular network broadcast information associated with the one or more available cellular networks; provide the cellular network broadcast information in a generic container message which varies in content and format according to one or more cellular standards associated with the one or more available cellular networks; receive a probe request from a wireless device; and cause the generic container message to be sent to the wireless device in response to the probe request. The WLAN may be further adapted to cause a network interworking indicator to be broadcasted, where the network interworking indicator is indicative of whether the cellular network broadcast information is available from the WLAN. On the other hand, the wireless device includes one or more processors; memory coupled to the one or more processors; an RF transceiver coupled to the one or more processors; and an antenna coupled to the RF transceiver. The one or more processors of the wireless device are operative to cause a probe request to be sent to a wireless local area network; receive a generic container message from the wireless local area network in response to the probe request, the generic container message varying in content and format according to one or more cellular standards associated with one or more available cellular networks; decode the generic container message to identify cellular network broadcast information associated with the one or more available cellular networks; and store the cellular network broadcast information in memory of the wireless device. The one or more processors may be further operative to receive a network interworking indicator which is broadcasted, where the network interworking indicator is indicative of whether the cellular network broadcast information is available from the wireless local area network.

Figure 5:
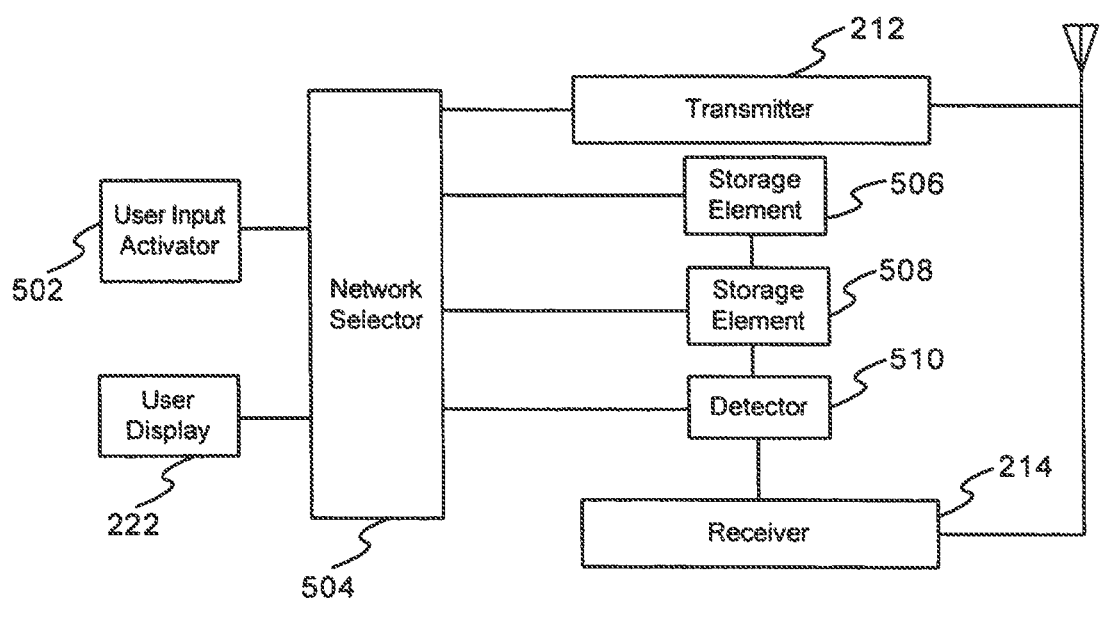
FIG. 5 is a block diagram illustrating typical network selection components of a wireless device.

FIG. 5 is a block diagram illustrating network selection on a wireless device. Network selection is performed with use of a network selector 504 and a detector module 510. Other modules involved in this process may include a user input activator module 502, a user display module 222, storage elements 506 and 508, a transmitter 214, and a receiver 212. Upon receiving the broadcast information from the WLAN, receiver 212 passes the information to detector module 242. Detector module 510 is adapted to detect whether the WLAN has network interworking capabilities. Once network selector 504 has determined it has sufficient information from WLAN 304 stored in storage element 508, it then uses this information with networks with which wireless device 300 is allowed to roam stored in storage element 506. Storage element 506, with respect to cellular network interworking, may be a SIM or U-SIM. A comparison between the information in storage element 508 and storage element 506 is then performed. Once a network has been selected, it is displayed to the user via user display 222. On the other hand, if the user is allowed to perform manual network selection, all available networks shall be displayed to the user via user display 222, and the user is able to select the network of choice with use of user input activator module 502.

Figure 6:
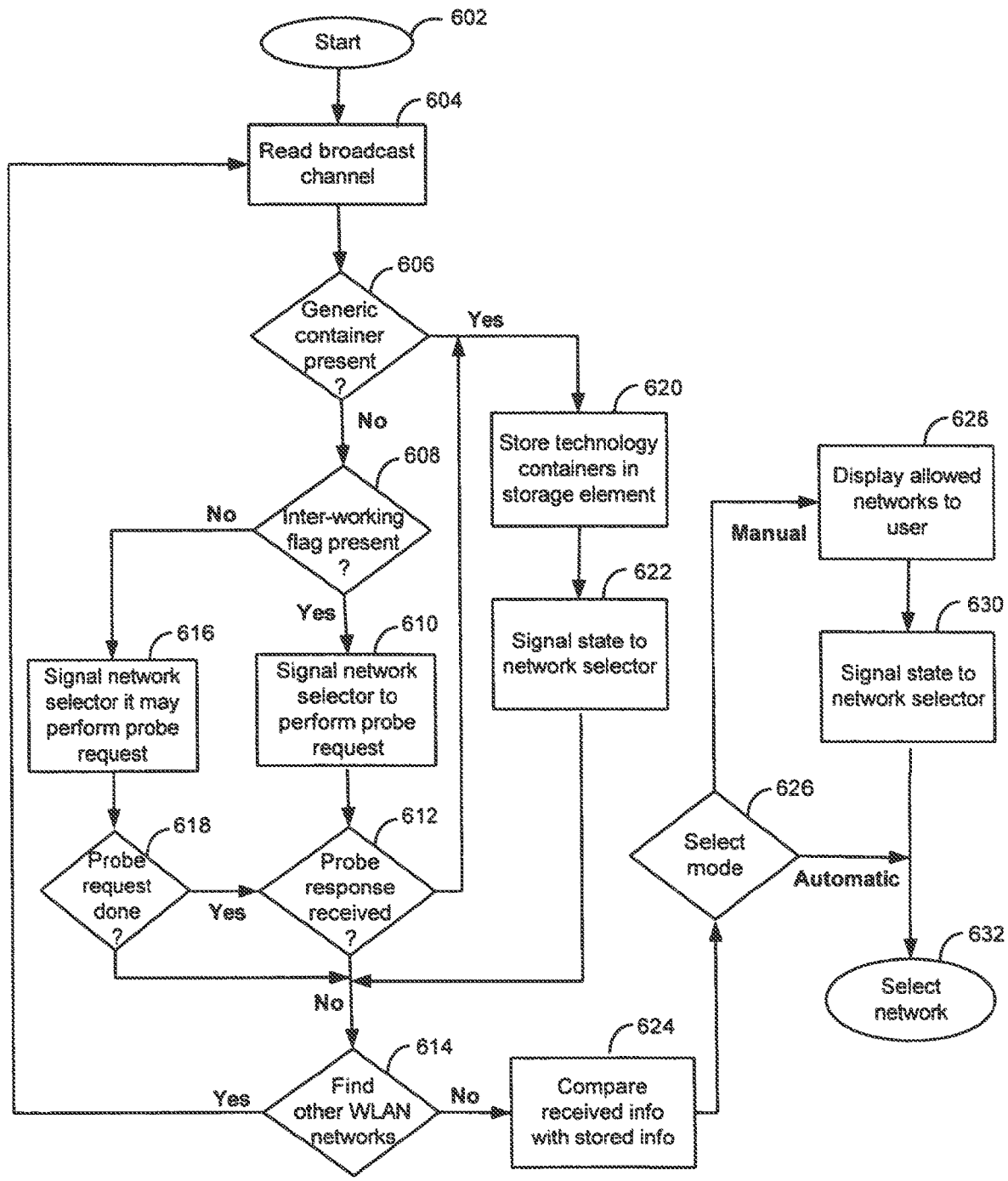
FIG. 6 is a flowchart illustrating a particular method of network selection by a wireless device.

FIG. 6 is a more detailed flowchart of a particular network selection method for a WLAN-enabled wireless device. This method may be performed in the environment described in relation to FIG. 3, with the wireless device shown and described in relation to FIGS. 1-2. The steps are performed by one or more controllers or processors (e.g. microprocessor 238 of FIG. 2) of the wireless device, in connection with any other necessary device components (e.g. its RF transceivers). As apparent from this description, the WLAN performs a complimentary method associated with the wireless device method. A computer program product of the present application may include a storage medium (e.g. FLASH memory 224 of FIG. 2) and computer instructions stored in the storage medium which are executed by the one or more processors for performing such methods.

The process of FIG. 6 begins at step 602 where the wireless device receives broadcast information from a WLAN at step 604. The wireless device determines whether a generic container message is present within the broadcast information (step 606 of FIG. 6). If a generic container message is not present at step 606, the wireless device determines whether there is a flag present which indicates whether network interworking is available from the WLAN (step 608 of FIG. 6). If the network interworking flag is present at step 608, network selector 504 (FIG. 5) is signalled to perform a probe request to the WLAN (step 610 of FIG. 6). Once the probe request is completed, the wireless device determines whether a probe response is received from the WLAN (step 612 of FIG. 6). If no network interworking flag is present at step 608, however, network selector 504 (FIG. 5) is signalled to perform a probe request at step 616. The system then determines whether the probe request is completed (step 618 of FIG. 6). If the probe request is completed at step 618, the method proceeds to step 612. If the probe request is not completed at step 618, the method proceeds to step 614.

If a probe response is received at step 612, or if a generic container is present at step 606, the method proceeds to step 620 to store the network broadcast information from the generic container message in storage element 506 (FIG. 5). After storage, network selector 504 will be signalled with a state change (step 622 of FIG. 6). This state change is communicated so that the wireless device will scan for other available WLANs at step 614. Steps 618 (probe request not done), 612 (probe response not received) and 622 (signal state to network selector) all feed into a decision box 614 which determines attempts to find other WLANs. If there are other WLANs identified at step 614, the method repeats again starting back at step 604 for the next WLAN.

If no other WLANs are found at step 614, the wireless device compares the received information with stored information in storage elements 506 and 508 (step 624 of FIG. 6). Next, either a manual mode of network selection or an automatic mode of network selection is identified for the wireless device (step 626 of FIG. 6). If the automatic mode is identified at step 626, a desired network is automatically selected by the wireless device for communication based on the comparison of step 624 (step 632 of FIG. 6). If the manual mode is identified at step 626, the wireless device visually displays the available and allowed networks to the end user (step 628 of FIG. 6). The end user then selects a network through the user interface of the wireless device, and this signals the state to the network selector (step 630 of FIG. 6) and the desired network is selected for communication at step 632.

Figure 7:
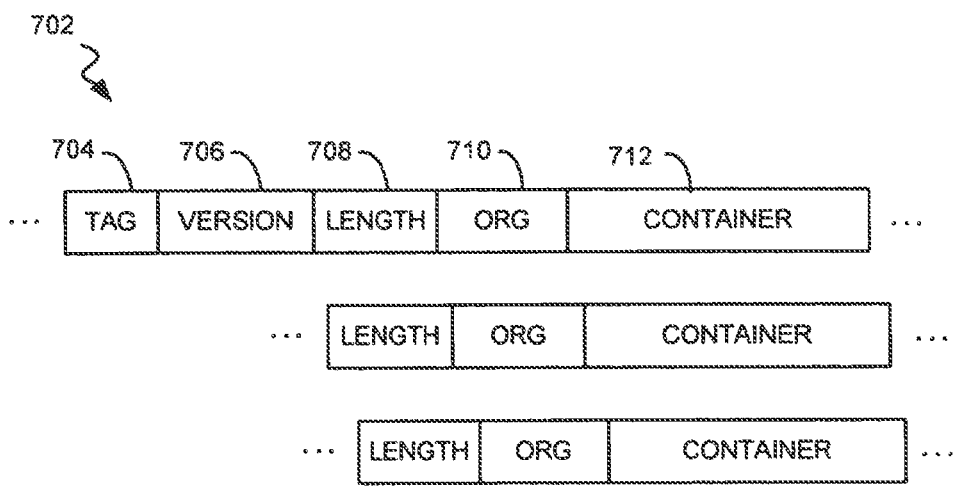
FIG. 7 is one example of a message format for a generic container message which may be utilized in the system.

FIG. 7 is one example of a message format for a generic container message transmitted by the WLAN and received at the wireless device. In this particular example, generic container message 702 includes a tag field 704, a version field 706, a length field 708, a technical/standards organization field 710, and a technology-specific container field 712. Tag field 704 contains data that identifies the message as a generic container message; version field 706 contains data that identifies a (standards) version of generic container message 702; organization field 710 contains data that defines the content and format of technology-specific container 712; length field 708 contains data that identifies a data length of technology-specific container 712; and technology-specific container field 712 includes cellular broadcast information which is specific to a particular cellular technology identified in organization field 710. A plurality of technology-specific containers may be sequentially provided in generic container message 702 (depending on the number of cellular networks available in the coverage area of the WLAN) along with a corresponding length and organization identifier.

As apparent, generic container message 702 is "generic" in that the content and format of the information in technology-specific container 712 may be defined by any cellular standard organization that is identified in organization field 710. Although the entire generic container message 702 has a predetermined message format (as this specific example reveals), the content and format within technology-specific container 712 is left flexible to be defined by different cellular standard organizations. The wireless device uses organization field 710 to select the appropriate technique for decoding the information in technology-specific container 712.

Figure 8:
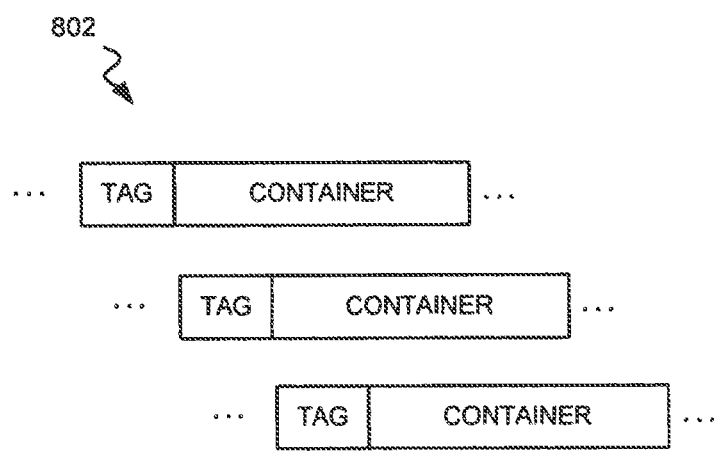
FIG. 8 is another example of a message format for the generic container message which may be utilized in the system.

As stated earlier above, the generic container message may alternatively or additionally include wireless network broadcast information from different types of wireless networks (e.g. Wi-MAX) which are available to the WLAN. The message format for generic container message 702 in FIG. 7 is a specific example only and variations are numerous. For example, the generic container message may include a tag field and a technology-specific container but not the others. This alternative example of a generic container message 802 is shown in FIG. 8. In this case, the specific cellular technology format/protocol found in the technology-specific container may be implied. Alternatively, the specific cellular technology format/protocol may be indicated in the tag field. The mobile station reads the information in the technology-specific container which ends when another tag field is identified. As another example, the generic container message includes a tag field, a version field, and the technology-specific container but not the others. In even another example, the generic container message includes a tag field, a version field, a length field, and the technology-specific container.

As described herein, an exemplary WLAN method of providing network broadcast information to one or more wireless devices includes the steps of receiving, from one or more available cellular networks or a network database, cellular network broadcast information associated with the one or more available cellular networks; providing the cellular network broadcast information in a generic container message which varies in content and format according to one or more cellular standards associated with the one or more available cellular networks; and causing the generic container message to be regularly broadcasted for receipt and use by a wireless device. A computer program product of the present application includes a storage medium and computer instructions stored on the storage medium, where the computer instructions are executable by one or more processors of a WLAN for performing the described method. Similarly, a WLAN of the present application is adapted to receive, from one or more available cellular networks or a network database, cellular network broadcast information associated with one or more available cellular networks; provide the cellular network broadcast information in a generic container message which varies in content and format according to one or more cellular standards associated with the one or more available cellular networks; and cause the generic container message to be regularly broadcasted for receipt and use by a wireless device. Note that the generic container message may alternatively or additionally include wireless network broadcast information from different types of wireless networks (e.g. Wi-MAX) which are available to the WLAN.

Related to the above techniques, an exemplary wireless device method of receiving and processing network broadcast information from a wireless local area network includes the steps of monitoring for broadcast information from a wireless local area network; receiving a generic container message from the wireless local area network which is regularly broadcasted by the wireless local area network, the generic container message including cellular network broadcast information associated with one or more available cellular networks which varies in content and format in accordance with one or more cellular standards associated with the one or more available cellular networks; decoding the generic container message to identify the cellular network broadcast information associated with the one or more available cellular networks; and storing the cellular network broadcast information in memory. A computer program product of the present application includes a storage medium and computer instructions stored on the storage medium, where the computer instructions are executable by one or more processors of a wireless device for performing the described method. A wireless device of the present application includes one or more processors; memory coupled to the one or more processors; a radio frequency (RF) transceiver coupled to the one or more processors; and an antenna coupled to the RF transceiver. The one or more processors of the wireless device are operative to monitor for broadcast information from a wireless local area network with use of the RF transceiver; receive a generic container message which is regularly broadcasted by the wireless local area network, the generic container message including cellular network broadcast information associated with one or more available cellular networks which varies in content and format in accordance with one or more cellular standards associated with the one or more available cellular networks; decode the generic container message to identify the cellular network broadcast information associated with the one or more available cellular networks; and store the cellular network broadcast information in the memory. The wireless device may be a dual mode device or a single mode device. Note that the generic container message may alternatively or additionally include wireless network broadcast information from different types of wireless networks (e.g. Wi-MAX) which are available to the WLAN.

Using an alternative technique, an exemplary WLAN method of providing network broadcast information to one or more wireless devices includes the steps of receiving, from one or more available cellular networks or a network database, cellular network broadcast information associated with the one or more available cellular networks; providing the cellular network broadcast information in a generic container message which varies in content and format according to one or more cellular standards associated with the one or more available cellular networks; receiving a probe request from a wireless device; and causing the generic container message to be sent to the wireless device in response to the probe request. This alternative method may include the further step of regularly broadcasting a network interworking indicator which is indicative of whether cellular network broadcast information is available from the WLAN. A computer program product of the present application includes a storage medium and computer instructions stored on the storage medium, where the computer instructions are executable by one or more processors of a WLAN for performing the described method. A WLAN of the present application is adapted to receive, from one or more available cellular networks or a network database, cellular network broadcast information associated with the one or more available cellular networks; provide the cellular network broadcast information in a generic container message which varies in content and format according to one or more cellular standards associated with the one or more available cellular networks; receive a probe request from a wireless device; and cause the generic container message to be sent to the wireless device in response to the probe request. The WLAN may be further adapted to regularly broadcast a network interworking indicator which is indicative of whether cellular network broadcast information is available from the WLAN. Note that the generic container message may alternatively or additionally include wireless network broadcast information from different types of wireless networks (e.g. Wi-MAX) which are available to the WLAN.

Related to the alternative techniques, a wireless device method of receiving and processing network broadcast information from a wireless local area network includes the steps of causing a probe request to be sent to a wireless local area network; receiving a generic container message from the wireless local area network in response to the probe request, the generic container message varying in content and format according to one or more cellular standards associated with one or more available cellular networks; decoding the generic container message to identify cellular network broadcast information associated with the one or more available cellular networks; and storing the cellular network broadcast information in memory. This alternative method may include the further step of receiving a broadcasted network interworking indicator which is indicative of whether cellular network broadcast information is available. A computer program product of the present application includes a storage medium and computer instructions stored on the storage medium, where the computer instructions are executable by one or more processors of a wireless device for performing the described method. A wireless device of the present application includes one or more processors; memory coupled to the one or more processors; a radio frequency (RF) transceiver coupled to the one or more processors; and an antenna coupled to the RF transceiver. The one or more processors of the wireless device are operative to cause a probe request to be sent to a wireless local area network; receive a generic container message from the wireless local area network in response to the probe request, the generic container message varying in content and format according to one or more cellular standards associated with one or more available cellular networks; decode the generic container message to identify cellular network broadcast information associated with the one or more available cellular networks; and store the cellular network broadcast information in memory of the wireless device. The one or more processors may be further operative to receive a broadcasted network interworking indicator which is indicative of whether cellular network broadcast information is available. Note that the generic container message may alternatively or additionally include wireless network broadcast information from different types of wireless networks (e.g. Wi-MAX) which are available to the WLAN.

The above-described embodiments of the present application are intended to be examples only. For example, although the wireless device was primarily described as a "dual mode" device, it may alternatively be a "single mode" device which communicates only through WLANs. Those of skill in the art may effect alterations, modifications and variations to the particular embodiments without departing from the scope of the application.

The invention claimed is:

1. A method for a wireless device, the method comprising:
receiving, at the wireless device, a network interworking indicator bit broadcasted by a wireless local area network (WLAN), the network interworking indicator bit indicating support of a capability of the WLAN to communicate network information identifying one or more networks;
in response to receiving the network interworking indicator bit, transmitting, from the wireless device, a request for network information;
in response to the request for network information, receiving, at the wireless device, a network information message comprising at least one of a network identifier or an organizational identifier which identifies a particular network from the one or more networks, wherein the network interworking indicator bit is different from the network identifier or the organizational identifier; and
selecting, at the wireless device, the particular network from the one or more networks.

2. The method of claim 1, wherein the wireless device registers the particular network.

3. The method of claim 1, wherein the wireless device selects the particular network in accordance with a preferred network list.

4. The method of claim 1, wherein the wireless device selects the particular network through manual selection via a user interface.

5. The method of claim 1, wherein the wireless device signals the selected particular network a Network Address Identifier (NAI).

6. A wireless device, comprising:
a memory; and
at least one hardware processor communicatively coupled with the memory and configured to:
receive, at the wireless device, a network interworking indicator bit broadcasted by a wireless local area network (WLAN), the network interworking indicator bit indicating support of a capability of the WLAN to communicate network information identifying one or more networks;
in response to receiving the network interworking indicator bit, transmit, from the wireless device, a request for network information;
in response to the request for network information, receive, at the wireless device, a network information message comprising at least one of a network identifier or an organizational identifier which identifies a particular network from the one or more networks, wherein the network interworking indicator bit is different from the network identifier or the organizational identifier; and
select, at the wireless device, the particular network from the one or more networks.

7. The wireless device of claim 6, wherein the wireless device registers the particular network.

8. The wireless device of claim 6, wherein the wireless device selects the particular network in accordance with a preferred network list.

9. The wireless device of claim 6, wherein the wireless device selects the particular network through manual selection via a user interface.

10. The wireless device of claim 6, wherein the wireless device signals the selected particular network a Network Address Identifier (NAI).

11. A method in a wireless local area network (WLAN), the method comprising:
broadcasting a network interworking indicator bit, the network interworking indicator bit indicating support of a capability of the WLAN to communicate network information identifying one or more networks;
in response to broadcasting the network interworking indicator bit, receiving, from a wireless device, a request message requesting the WLAN to send the network information which identifies the one or more networks to the wireless device;
in response to the request message, transmitting, to the wireless device, a network information message comprising at least one of a network identifier or an organizational identifier which identifies a particular network from the one or more networks; and
receiving, from the wireless device, a registration to the particular network from the one or more networks.

12. The method of claim 11, wherein the particular network receives, from the wireless device, a Network Address Identifier (NAI).

13. The method of claim 11, wherein a format of the request message is configured according to an Institute of Electrical and Electronics Engineers (IEEE) 802.11 standard.

14. The method of claim 11, wherein the one or more networks identified by the network information include at least one 3rd Generation Partnership Project (3GPP) network.

15. A wireless local area network (WLAN), comprising:
a memory; and
at least one hardware processor communicatively coupled with the memory and configured to:
broadcast a network interworking indicator bit, the network interworking indicator bit indicating support of a capability of the WLAN to communicate network information identifying one or more networks;
in response to broadcasting the network interworking indicator bit, receive, from a wireless device, a request message requesting the WLAN to send the network information which identifies the one or more networks to the wireless device;
in response to the request message, transmit, to the wireless device, a network information message comprising at least one of a network identifier or an organizational identifier which identifies a particular network from the one or more networks; and
receive, from the wireless device, a registration to a particular network from the one or more networks.

16. The WLAN of claim 15, wherein the particular network receives, from the wireless device, a Network Address Identifier (NAI).

17. The WLAN of claim 15, wherein a format of the request message is configured according to an Institute of Electrical and Electronics Engineers (IEEE) 802.11 standard.

18. The WLAN of claim 15, wherein the one or more networks identified by the network information include at least one 3rd Generation Partnership Project (3GPP) network.

\* \* \* \* \*